(12) United States Patent
Erb et al.

(10) Patent No.: US 10,391,877 B2
(45) Date of Patent: Aug. 27, 2019

(54) SYSTEMS AND METHODS FOR FACILITATING COURTESY CHARGING STATION HAND-OFFS BETWEEN ELECTRIFIED VEHICLE USERS

(71) Applicant: FORD GLOBAL TECHNOLOGIES, LLC, Dearborn, MI (US)

(72) Inventors: Dylan Erb, Allen Park, MI (US); Alexander Bartlett, Wyandotte, MI (US); Jacob Wiles, Plymouth, MI (US); Bikram Singh, Royal Oak, MI (US); Baocheng Sun, Beverly Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 15/981,091

(22) Filed: May 16, 2018

(65) Prior Publication Data

US 2019/0217717 A1 Jul. 18, 2019

Related U.S. Application Data

(63) Continuation-in-part of application No. 15/873,949, filed on Jan. 18, 2018.

(51) Int. Cl.
*B60L 11/18* (2006.01)
*H02J 7/00* (2006.01)

(52) U.S. Cl.
CPC ....... *B60L 11/1838* (2013.01); *B60L 11/1862* (2013.01); *H02J 7/0027* (2013.01); *H02J 7/0047* (2013.01)

(58) Field of Classification Search
CPC ............ G08G 1/20; H04L 67/26; H04L 67/34

USPC ......................................................... 340/990
See application file for complete search history.

(56) References Cited

U.S. PATENT DOCUMENTS

| 5,614,808 | A | 3/1997 | Konoya et al. |
| 8,125,324 | B2 | 2/2012 | Frey et al. |
| 8,179,245 | B2 * | 5/2012 | Chander ............. B60L 11/1818 340/455 |
| 9,352,659 | B1 | 5/2016 | Turner |
| 9,387,771 | B1 | 7/2016 | Shekher |
| 9,457,682 | B2 | 10/2016 | Twarog et al. |

(Continued)

*Primary Examiner* — Joseph H Feild
*Assistant Examiner* — Sharmin Akhter
(74) *Attorney, Agent, or Firm* — Carlson, Gaskey & Olds (57) ABSTRACT

This disclosure describes exemplary electrified vehicle charging systems for charging battery packs. An exemplary charging system includes a visual indicator (e.g., pictogram, text, or both) located on-board the vehicle that can be automatically illuminated once the battery pack has been charged to a predefined minimum state of charge (SOC) threshold. The visual indicator communicates charging status messages to other electrified vehicle users, and once illuminated, provides an intuitive indication to the other vehicle users that the electrified vehicle that is currently on-plug has received a sufficient amount of charge and therefore may be unplugged from a charging station. The visual indicator therefore facilitates a courtesy hand-off of charging station components from one electrified vehicle user to another. In addition to or instead of the on-board visual indicator, the charging system may facilitate courtesy hand-offs between electrified vehicle users by broadcasting charging status messages through one or more mobile applications.

18 Claims, 9 Drawing Sheets

(56) References Cited

U.S. PATENT DOCUMENTS

| | | | |
|---|---|---|---|
| 2005/0144251 A1* | 6/2005 | Slate | H04L 29/06 |
| | | | 709/215 |
| 2017/0015208 A1 | 1/2017 | Dunlap et al. | |
| 2017/0063994 A1 | 3/2017 | Lei et al. | |
| 2017/0240060 A1 | 8/2017 | Roberts et al. | |
| 2018/0105051 A1* | 4/2018 | Zheng | B60L 11/1824 |

* cited by examiner

SYSTEMS AND METHODS FOR FACILITATING COURTESY CHARGING STATION HAND-OFFS BETWEEN ELECTRIFIED VEHICLE USERS

CROSS-REFERENCE TO RELATED APPLICATIONS

This is a continuation-in-part of U.S. patent application Ser. No. 15/873,949, which was filed on Jan. 18, 2018, the entire disclosure of which is incorporated herein by reference.

TECHNICAL FIELD

This disclosure relates to vehicle charging systems that include visual indicators and/or mobile applications for facilitating courtesy hand-offs of charging station components from one electrified vehicle user to another electrified vehicle user who is waiting to charge.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A charging system typically connects an electrified vehicle to an external power source, such as a wall outlet or a charging station, for charging the battery pack of the vehicle. Plug-in hybrid electric vehicles and battery electric vehicles, for example, include a vehicle inlet assembly having ports for receiving a connector from the charging station.

An electrified vehicle user may encounter situations in which he/she arrives at a public charging station that is already being used by another electrified vehicle user. It may be desirable for the electrified vehicle user to ascertain whether the other vehicle has either completed charging or received a sufficient amount of charge to permit the connector to be unplugged from the vehicle and then connected to the user's own vehicle for charging. Electrified vehicle users may also wish to ascertain the charging status at a particular charging station prior to their arrival at the charging station. There are currently no known solutions to these problems. Improvements are therefore desired in the field of electrified vehicle charging.

SUMMARY

A charging system for an electrified vehicle according to an exemplary aspect of the present disclosure includes, among other things, a battery pack and a charging component in charging connection with the battery pack. A control module is configured to receive an input from a mobile device associated with the electrified vehicle indicating that a charge hand-off feature is enabled and command the mobile device to broadcast a charging status message that facilitates a courtesy hand-off of a charging station component to another electrified vehicle user.

In a further non-limiting embodiment of the foregoing charging system, the charging component is a vehicle inlet assembly.

In a further non-limiting embodiment of either of the foregoing charging systems, the mobile device is configured through an application to input a predefined minimum state of charge (SOC) threshold associated with the charge hand-off feature.

In a further non-limiting embodiment of any of the foregoing charging systems, the charging status message indicates that the predefined minimum SOC has been reached and thus the courtesy hand-off can occur.

In a further non-limiting embodiment of any of the foregoing charging systems, the charging status message indicates an amount of time remaining before reaching the predefined minimum SOC.

In a further non-limiting embodiment of any of the foregoing charging systems, the system includes a visual indicator on the charging component.

In a further non-limiting embodiment of any of the foregoing charging systems, the control module is configured to illuminate the visual indicator in response to reaching a predefined state of charge (SOC) threshold of the battery pack.

In a further non-limiting embodiment of any of the foregoing charging systems, the charging status message is broadcast from the mobile device to at least one other mobile device associated with the another electrified vehicle user.

In a further non-limiting embodiment of any of the foregoing charging systems, the system includes a communication system having a first transceiver configured to wirelessly communicate with a second transceiver of the mobile device.

In a further non-limiting embodiment of any of the foregoing charging systems, the charging station component is a charge cord of a public charging station.

In a further non-limiting embodiment of any of the foregoing charging systems, the mobile device includes an application having a user interface configured to enter the input and to set a predefined minimum SOC threshold that is associated with the charge hand-off feature.

In a further non-limiting embodiment of any of the foregoing charging systems, the user interface includes a first toggle for entering the input and a second toggle for setting the predefined minimum SOC threshold.

A method according to another exemplary aspect of the present disclosure includes, among other things, receiving, at an on-board control module of an electrified vehicle, an input from a mobile device associated with the electrified vehicle indicating that a charge hand-off feature is enabled and commanding the mobile device to broadcast a charging status message that facilitates a courtesy hand-off of a charging station component to another electrified vehicle user.

In a further non-limiting embodiment of the foregoing method, the method includes illuminating a visual indicator of a charging component located on-board the electrified vehicle in response to reaching a predefined minimum state of charge (SOC) threshold when charging a battery pack of the electrified vehicle.

In a further non-limiting embodiment of either of the foregoing methods, the mobile device is configured through an application to input a predefined minimum state of charge (SOC) threshold associated with the charge hand-off feature.

In a further non-limiting embodiment of any of the foregoing methods, the charging status message indicates that the predefined minimum SOC has been reached and thus the courtesy hand-off can occur.

In a further non-limiting embodiment of any of the foregoing methods, the charging status message indicates an amount of time remaining before reaching the predefined minimum SOC.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes exemplary electrified vehicle charging systems for charging energy storage devices (e.g., battery packs). An exemplary charging system includes a visual indicator located on-board the vehicle that can be automatically illuminated once the battery pack has been charged to a predefined minimum state of charge (SOC) threshold. The visual indicator may include a pictogram, text, or both for communicating charging status messages to other electrified vehicle users. Once illuminated, the visual indicator provides an intuitive indication to the other vehicle users that the electrified vehicle that is currently on-plug has received a sufficient amount of charge and therefore may be unplugged from a charging station. The visual indicator therefore facilitates a courtesy hand-off of charging station components from one electrified vehicle user to another. In addition to or instead of the on-board visual indicator, the charging system may facilitate courtesy hand-offs between electrified vehicle users by broadcasting charging status messages through one or more mobile applications. These and other features are discussed in greater detail in the following paragraphs of this detailed description.

Figure 1:
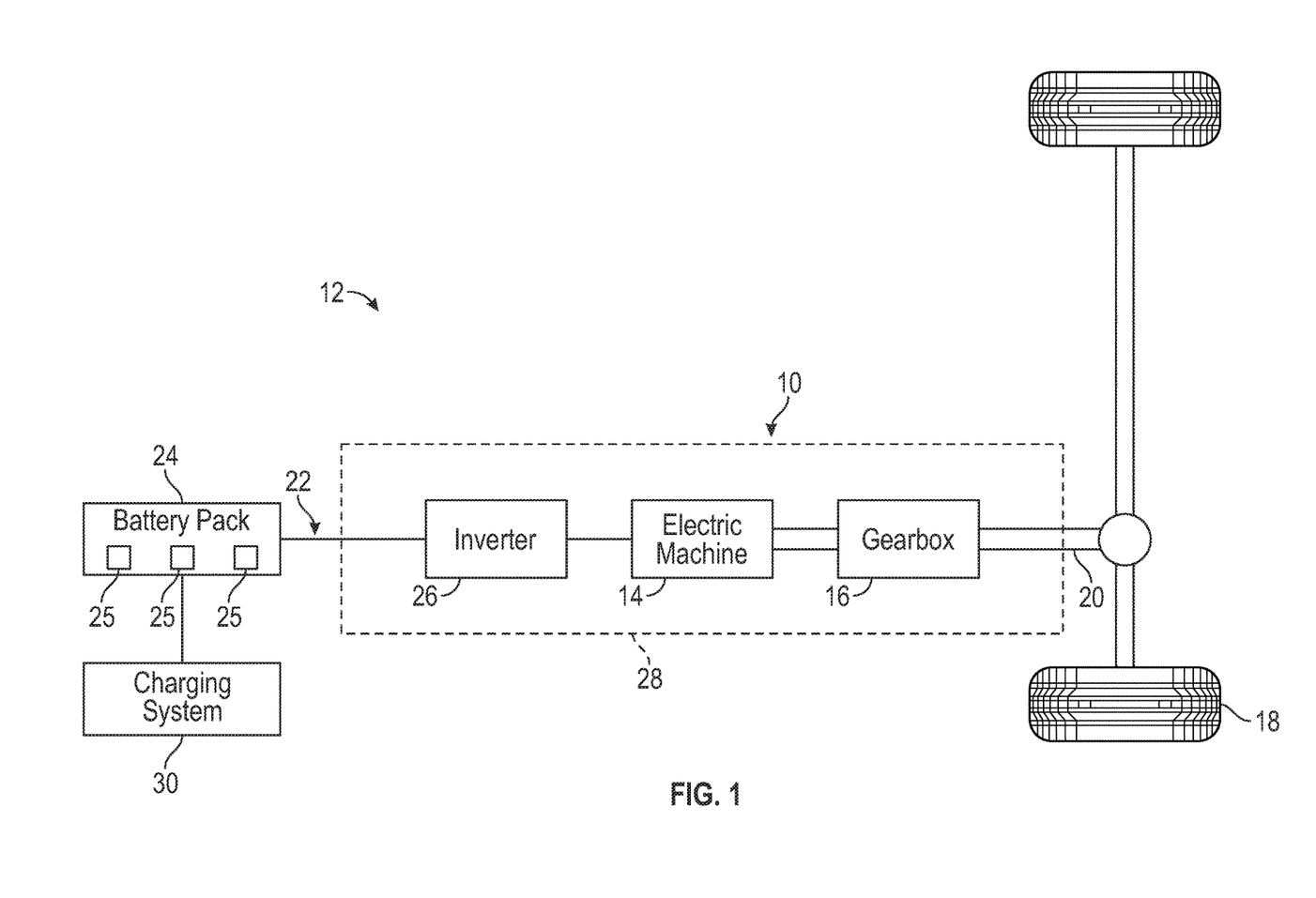
FIG. 1 schematically illustrates a powertrain of an electrified vehicle.

FIG. 1 schematically illustrates a powertrain 10 of an electrified vehicle 12. The electrified vehicle 12 may be a battery electric vehicle (BEV) or a plug-in hybrid electric vehicle (PHEV), for example. Therefore, although not shown in this embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. As described in greater detail below, the charging system 30 may include charging components that are located both onboard the electrified vehicle 12 and external to the electrified vehicle 12. The charging system 30 can be connected to an external power source for receiving and distributing power received from the external power source throughout the electrified vehicle 12.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to cars, trucks, sport utility vehicles, boats, planes, etc.

Figure 2:
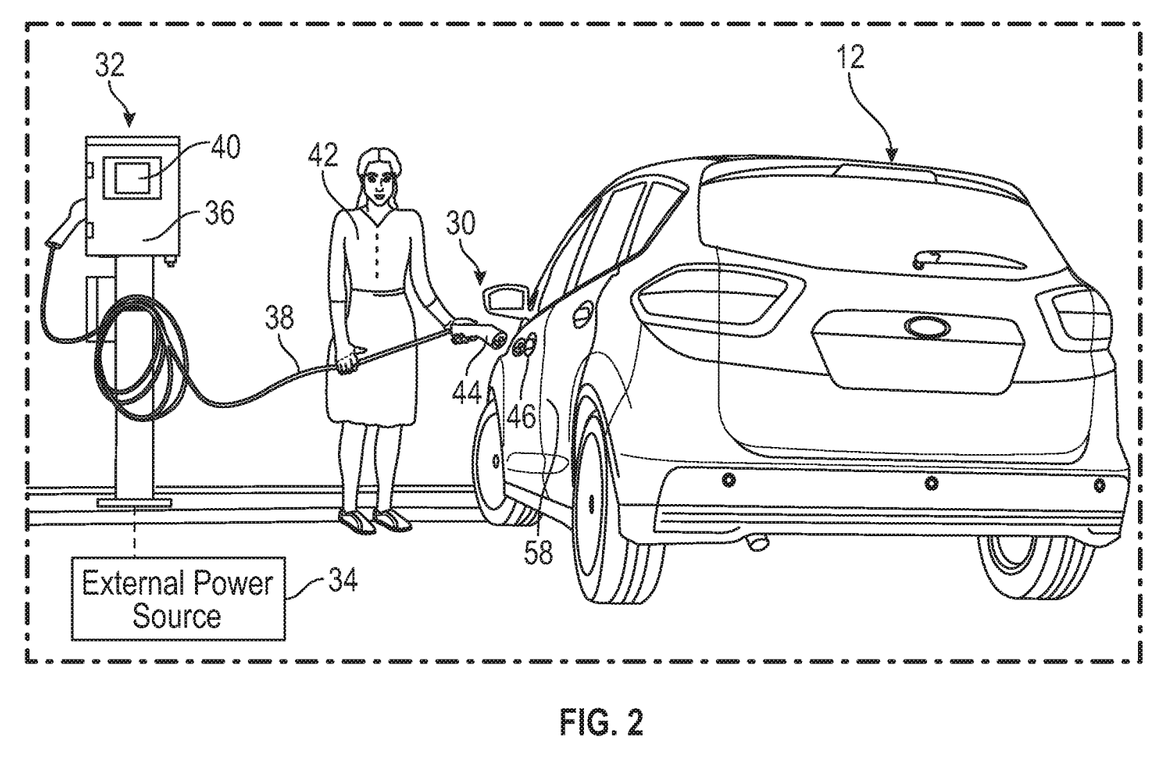
FIG. 2 schematically illustrates an electrified vehicle while being charged at a charging station.

FIG. 2 illustrates an electrified vehicle 12 parked near a charging station 32 for charging. The electrified vehicle 12 may employ the powertrain 10 shown in FIG. 1 or any similar electrified powertrain.

The charging station 32 is powered by an external power source 34 (shown schematically). In an embodiment, the external power source 34 includes utility grid power. In another embodiment, the external power source 34 includes an alternative energy source, such as solar power, wind power, etc. In yet another embodiment, the external power source 34 includes a combination of utility grid power and alternative energy sources.

The charging station 32 may include, among other things, a housing 36 and a charge cord 38. In general, the housing 36 houses the various internal components of the charging station 32. The size, shape, and configuration of the housing 36 is not intended to limit this disclosure. The housing 36 may additionally include an output display 40 for displaying information to a user 42 of the electrified vehicle 12.

Figure 3:
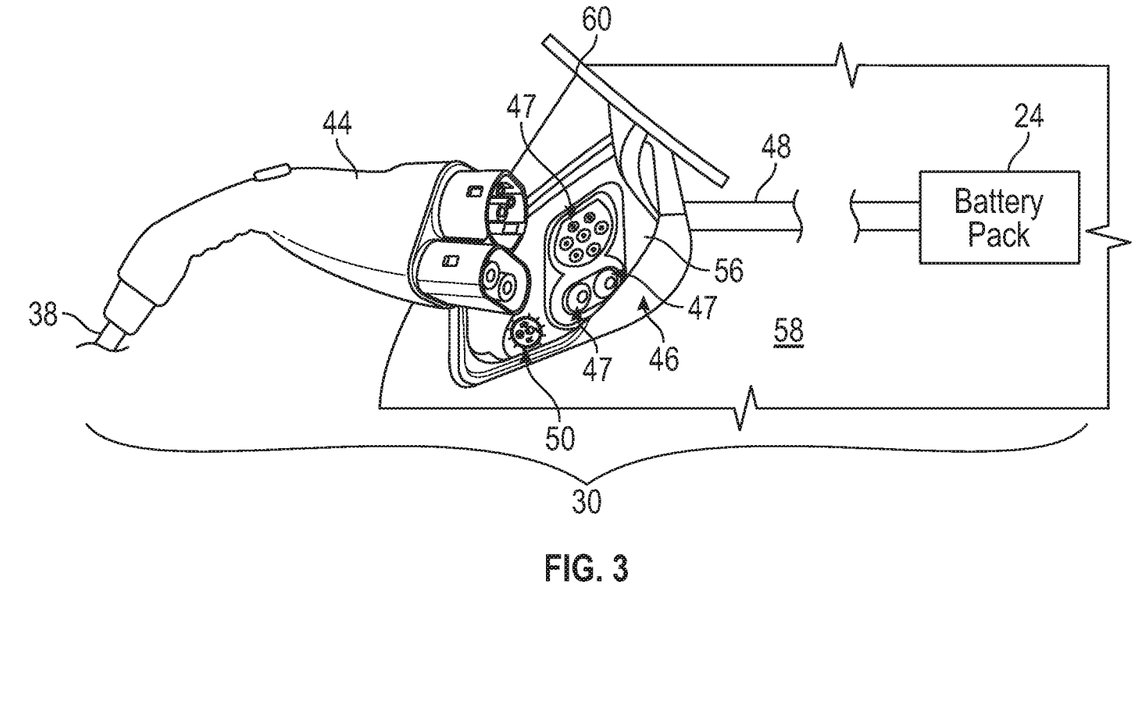
FIG. 3 illustrates an exemplary charging system for charging an electrified vehicle.

Referring now to FIGS. 2 and 3, the charge cord 38 may extend outside of the housing 36 for connecting to the electrified vehicle 12. For example, the charge cord 38 may include a charge connector 44 that is configured to connect to a vehicle inlet assembly 46 of the electrified vehicle 12. The vehicle inlet assembly 46 includes a plurality of ports 47 that each include a mating terminal for carrying current during charging events. Power originating from the external power source 34 may be transferred from the charging station 32 to the vehicle inlet assembly 46 for charging the battery pack 24 of the electrified vehicle 12 via the charge connector 44 that is attached to the charge cord 38. One or more high voltage cables 48 connect between the vehicle inlet assembly 46 and the battery pack 24 for transferring the power received by the vehicle inlet assembly 46 to the battery pack 24 for replenishing the energy of the battery cells of the battery pack 24.

The charging system 30 may include a multitude of charging components. In an embodiment, the charge cord 38, the charge connector 44, the vehicle inlet assembly 46, the high voltage cable 48, and the battery pack 24 make up the charging system 30 of the electrified vehicle 12. Thus, the charging system 30 can include components that are located both onboard and external to the electrified vehicle 12. The charging system 30 may be configured to deliver power to the battery pack 24 using any type of charging (e.g., AC, DC, etc.).

In some instances, the user 42 may venture away from the electrified vehicle 12 during the charging event. During the absence of the user 42, a driver/user of another electrified vehicle may arrive at the charging station 32. It may be desirable for the driver of this other electrified vehicle to ascertain whether the electrified vehicle 12 has been charged up to a desired state of charge before unplugging the charge connector 44 from the vehicle inlet assembly 46 of the electrified vehicle 12 and connecting it to a vehicle inlet assembly of the driver's own vehicle. The charging system 30 may therefore be equipped with a visual indicator 50 for providing notice to the user that charging has completed and that it is acceptable to unplug the charge connector 44 from the vehicle inlet assembly 46 of the electrified vehicle 12. Exemplary visual indicators that are suitable for facilitating this type of courtesy hand-off are discussed in further detail below.

Figure 4:
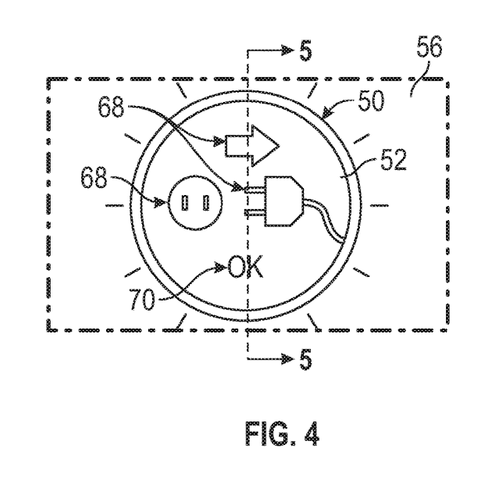
FIG. 4 is a blown up view of a visual indicator of the charging system of FIG. 3 according to a first embodiment of this disclosure.
Figure 5:
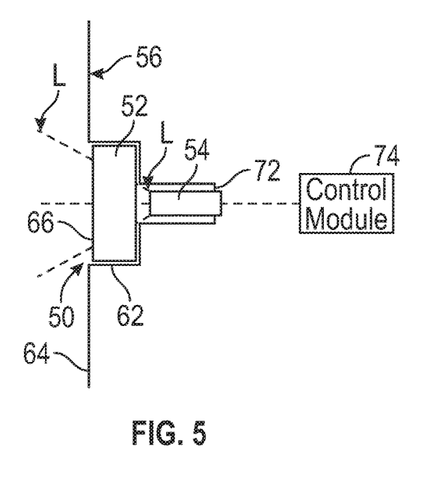
FIG. 5 is a cross sectional view through section A-A of the visual indicator of FIG. 4.

FIGS. 4-5, with continued reference to FIGS. 1-3, illustrate an exemplary visual indicator 50 of the charging system 30. In an embodiment, the visual indicator 50 includes an insert 52 and a light source 54.

The insert 52 may be mounted relative to any charging component of the charging system 30 for providing an intuitive indication of the charging status of the electrified vehicle 12. In an embodiment, the insert 52 is mounted within a housing 56 of the vehicle inlet assembly 46. The housing 56 is permanently mounted to a vehicle body 58 (see FIGS. 2 and 3). The insert 52 may be mounted at a location near the ports 47 that is easily visible when a door 60 (see FIG. 3) of the vehicle inlet assembly 46 is moved to an open position. The size, shape, and material make-up of the insert 52 are not intended to limit this disclosure. The insert 52 may be positioned within an opening 62 formed in an outer face 64 of the housing 56 such that an outer surface 66 of the insert 52 sits flush with the outer face 64. However, other mounting configurations are also contemplated within the scope of this disclosure.

A plurality of markings may be provided on the insert 52 for communicating charging status messages to electrified vehicle users. The markings may be formed on or in the insert 52 using a variety of techniques that are in no way intended to limit this disclosure. In an embodiment, the markings indicate a 'charge complete' message for alerting electrified vehicle users that it is acceptable to unplug the charge connector 44 from the vehicle inlet assembly 46 and then use the charge connector 44 to charge their own vehicle.

Figure 6:
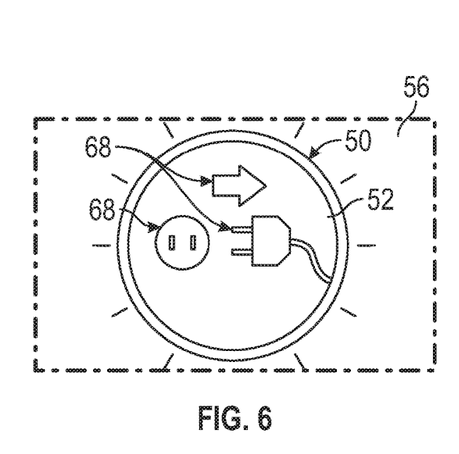
FIGS. 6 and 7 illustrate visual indicators according to additional embodiments of this disclosure.
Figure 7:
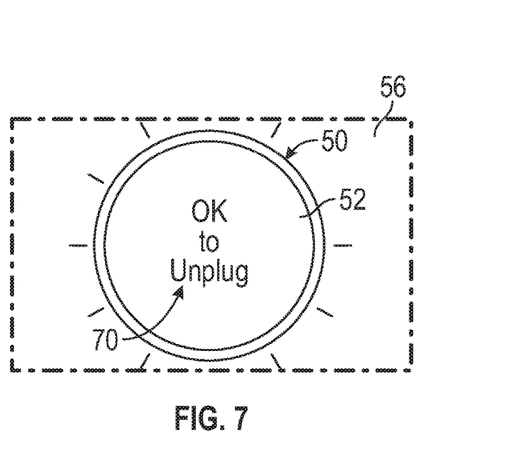

In a first embodiment, the insert 52 includes a combination of pictograms 68 and words 70 for communicating the charge complete message to the electrified vehicle users. In a second embodiment, the insert 52 includes only pictograms 68 for displaying the charge complete message (see FIG. 6). In a third embodiment, the insert 52 includes only words 70 for communicating the charge complete message (see FIG. 7). The pictograms 68 and words 70 shown in FIGS. 4, 6, and 7 are intended as non-limiting examples, and it should be understood that various other markings could be used within the scope of this disclosure.

The light source 54 may be positioned behind the insert 52, such as near an inner face 72 of the housing 56, and is configured to emit light L for selectively illuminating the insert 52, including the pictograms 68 and/or words 70 of the insert 52. In an embodiment, the light source 54 is a light emitting diode (LED). However, other light sources could also be utilized within the scope of this disclosure. In addition, although only a single light source 54 is shown, it should be understood that the visual indicator 50 could incorporate additional light sources.

The light source 54 may be controlled by a control module 74. The control module 74 includes a processor and memory and can be programmed with instructions for controlling when to illuminate the visual indicator 50 for displaying its included message. For example, the control module 74 may control the light source 54 so that it emits light only when the battery pack 24 has been charged to a minimum state of charge (SOC) threshold. In other words, the light source 54 can be turned ON when the SOC of the battery pack 24 is at or above a minimum SOC threshold and can be turned OFF when the SOC of the battery pack 24 is below the minimum SOC threshold.

Figure 8:
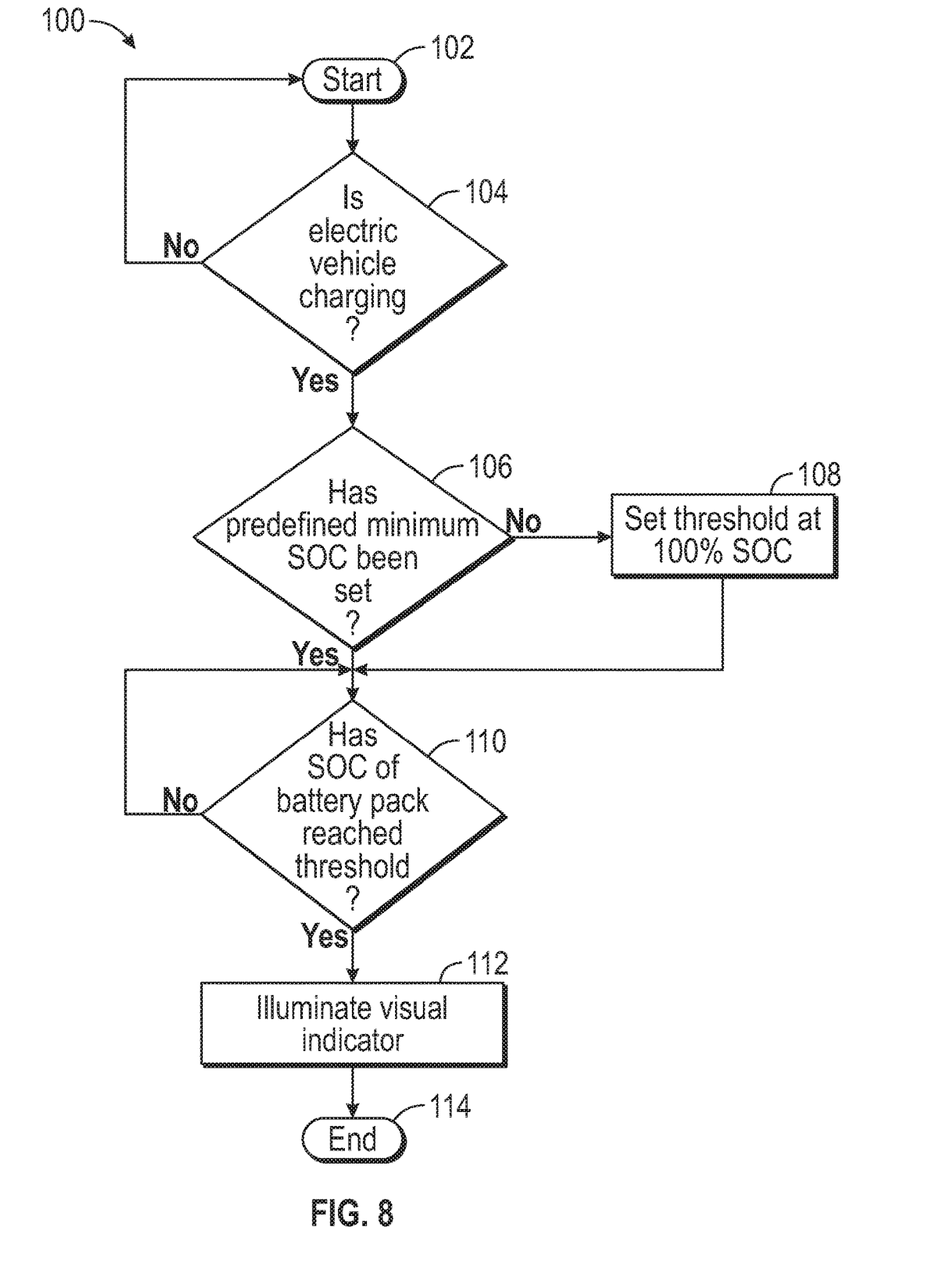
FIG. 8 schematically illustrates a method of illuminating a visual indicator of a vehicle charging system for facilitating a courtesy hand-off of charging station equipment from one electrified vehicle to another.

FIG. 8, with continued reference to FIGS. 1-7, schematically illustrates a method 100 for controlling the visual indicator 50. In an embodiment, the control module 74 is programmed with one or more algorithms adapted to execute the exemplary method 100.

The exemplary method 100 begins at block 102. At block 104, the control module 74 monitors whether the electrified vehicle 12 is charging. For example, the control module 74 may receive a plug connection signal in response to the user 42 plugging the charge connector 44 into the vehicle inlet assembly 46. If block 104 returns a YES flag, the method 100 proceeds to block 106. Alternatively, if a NO flag is returned, the method 100 returns to block 102.

At block 106, the control module 74 monitors whether the user 42 has set a predefined minimum SOC threshold for charging the battery pack 24. The predefined minimum SOC threshold represents the minimum SOC of the battery pack 24 that must be achieved during the charging event before illuminating the visual indicator 50. Therefore, the predefined minimum SOC threshold sets the threshold at which the user 42 will allow another user to unplug the charge connector 44 from the vehicle inlet assembly 46.

Figure 9:
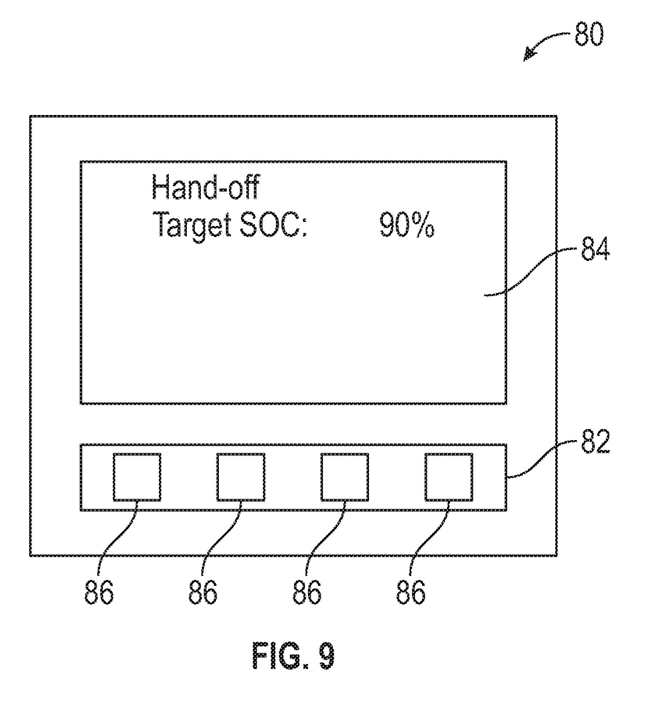
FIG. 9 illustrates an exemplary human machine interface of an electrified vehicle.

In an embodiment, the predefined minimum SOC threshold is set by the user 42 using a human machine interface 80 (see, for example, FIG. 9) located within a passenger cabin of the electrified vehicle 12. The human machine interface 80 may include a user input 82 and a display 84, both of which are shown schematically in FIG. 9. The user input 82 may include a touchscreen and/or series of tactile buttons 86 for entering information. The display 84 may include a touchscreen and/or series of gauges for displaying information to the driver. In another non-limiting embodiment, the human machine interface 80 is part of an in-dash infotainment system of the electrified vehicle 12. The predefined minimum SOC threshold could alternatively be set by the user 42 using a mobile device that is configured to execute the instructions of one or more mobile applications (e.g., MyFord® Mobile) for communicating information to the control module 74. If the predefined minimum SOC threshold has not been set, the control module 74 sets a default value of 100% SOC at block 108.

Next, at block 110, the control module 74 monitors whether the current SOC of the battery pack 24 has reached the predefined minimum SOC threshold. If YES, the visual indicator 50 is illuminated by actuating the light source 54 at block 112. Once illuminated, the visual indicator 50 indicates to other electrified vehicle users that the user 42 considers charging to be complete and will permit the other users to unplug the electrified vehicle 12 from the charging station 32. The method 100 then ends at block 114.

The on-board visual indicators described above provide intuitive indications of "charge complete" messages with clear visual indicators that can take the form of pictograms, text, or both. The visual indicators therefore facilitate courtesy hand-offs to other electrified vehicle users who are waiting to charge their own vehicles. The courtesy hand-off can occur prior to a 100% SOC if the user does not require a full charge, thereby facilitating a smoother, less frustrating user charging experience.

Figure 10:
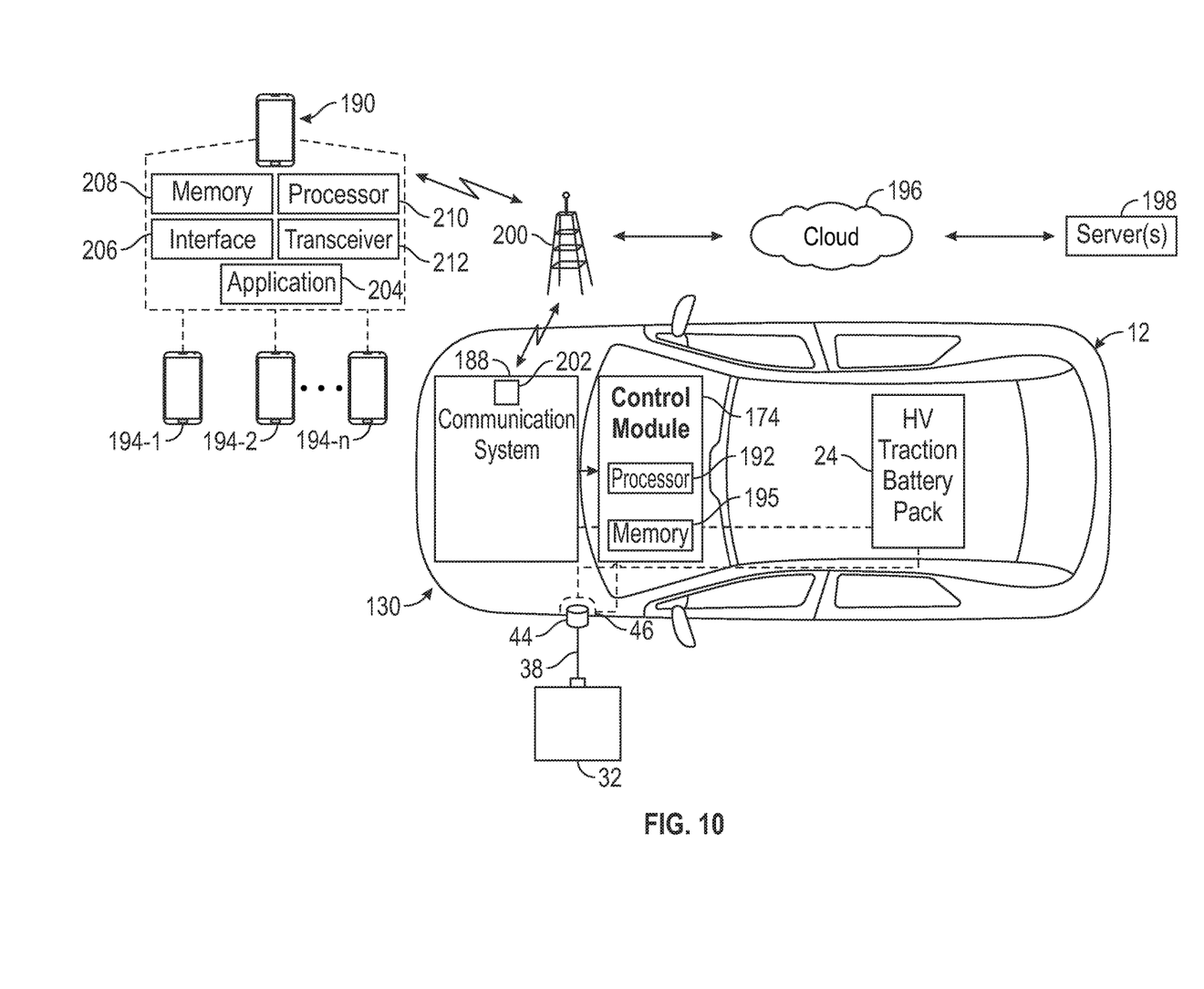
FIG. 10 schematically illustrates another exemplary charging system for controlling charging of an electrified vehicle.

In addition to or instead of providing the on-board visual indicators described above, it may be desirable to communicate the charging status of a particular electrified vehicle charging at a charging station to other electrified vehicle users who are either not in viewing distance of the visual indicators or have not yet arrived at the charging station. FIG. 10 illustrates an improved charging system 130 of the electrified vehicle 12. As described in greater detail below, the charging system 130 is capable of facilitating charging station hand-offs to such remote electrified vehicle users that wish to charge their vehicles at the charging station 32 currently occupied by the electrified vehicle 12.

As schematically illustrated, the exemplary charging system 130 may include a battery pack 24, a vehicle inlet assembly 46 in charging connection with the battery pack 24, and a charge cord 38 that includes a charge connector 44 that is configured to connect to the vehicle inlet assembly 46 for transferring power from the charging station 32 to the vehicle inlet assembly 46 for charging the battery pack 24. Thus, the charging system 130 can include components that are located both onboard and external to the electrified vehicle 12. The charge cord 38 could either be integrally connected to the charging station 32 or could be part of electric vehicle supply equipment (EVSE) that is both connectable and detachable relative to each of the vehicle inlet assembly 46 and the charging station 32.

The charging system 130 may additionally include a control module 174, a communication system 188, and a mobile device 190 that is associated with the owner/user of the electrified vehicle 12. These components/systems are described in greater detail below.

The control module 174 is configured to control charging of the electrified vehicle 12 once connected to the charging station 32. The control module 174 may be part of an overall vehicle control system or could be a separate control system that communicates with the vehicle control system. The control module 174 may be equipped with the necessary hardware and software for interfacing with and commanding operation of the various components of the charging system 130. In an embodiment, the control module 174 includes a processing unit 192 and non-transitory memory 195 for executing the various control strategies and operations of the charging system 130.

The communication system 188 may be configured to communicate over a cloud 196 (i.e., the internal to obtain various information stored on one or more servers 198. Each server 198 can identify, collect, and store user data associated with the electrified vehicle 12 for validation purposes. Upon an authorized request, data may be subsequently transmitted to the communication system 188, via a cellular tower 200 or some other known communication technique (e.g., Wi-Fi, Bluetooth, etc.). The communication system 188 may include a transceiver 202 for achieving bidirectional communication with the cellular tower 200. For example, the transceiver 202 can receive data from the servers 198 or can communicate data back to the servers 198 via the cellular tower 200. Although not necessarily shown or described in this highly schematic embodiment, numerous other components may enable bidirectional communication between the electrified vehicle 12 and the web-based servers 198.

Once the mobile device 190 has been validated and synced to the electrified vehicle 12, the communication system 188 may also communicate with the mobile device 190 over the bidirectional communication link established between the transceiver 202 and the cellular tower 200. Communications between the communication system 188 and the mobile device 190 may occur over a wireless link, an Internet connection, or a combination of these.

The mobile device 190 (e.g., smart phone, tablet, computer, etc.) in most implementations belongs to the owner/user of the electrified vehicle 12. The mobile device 190 includes an application 204 that includes programming to allow the user to use a user interface 206 to enter charging settings for controlling charging of the electrified vehicle 12. The application 204 may be stored in memory 208 of the mobile device 190 and may be executed by a processor 210 of the mobile device 190. The mobile device 190 may additionally include a transceiver 212 that is configured to communicate with the transceiver 202 of the communication system 188 over the cellular tower 200 or some other wireless link.

In an embodiment, the user of the electrified vehicle 12 may use the application 204 to either enable or disable the charge hand-off feature and to set the predefined minimum SOC threshold that is associated with the charge hand-off feature. These charge settings are received as inputs by the control module 174. The control module 174 may then monitor and control charging of the battery pack 24 based on these inputs.

In some embodiments, the control module 174 may periodically command the mobile device 190 to broadcast charging status messages associated with the charge hand-off feature through the application 204. The charging status messages could include an amount of time remaining before reaching the predefined minimum SOC and/or that the predefined minimum SOC has been reached and thus the charge hand-off can occur. The charging status messages may be broadcast by the mobile device 190 to one or more additional mobile devices 194-n, such as through an application programming interface (API) of the application 204 that enables communication with other applications on other devices. The additional mobile devices 194-n represent mobile devices of other electrified vehicle users who may desire to use the charging station 32 to charge their own vehicles. These other electrified vehicle users can therefore understand the current charging status of the charging station 32 even if they are completely remote from the charging station 32.

Figure 11A:
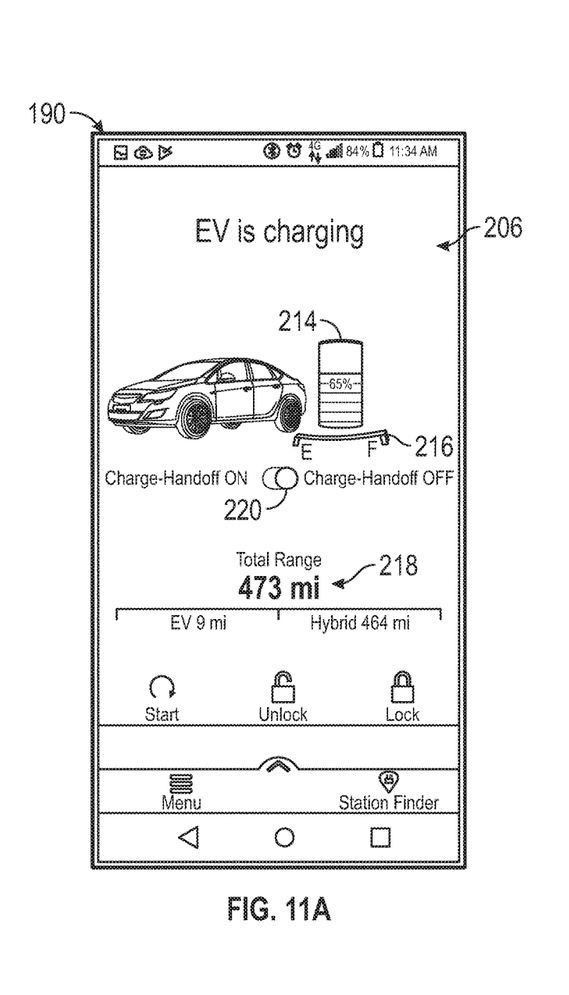
FIGS. 11A and 11B illustrate exemplary user interfaces of a mobile application of the charging system of FIG. 10.
Figure 11B:
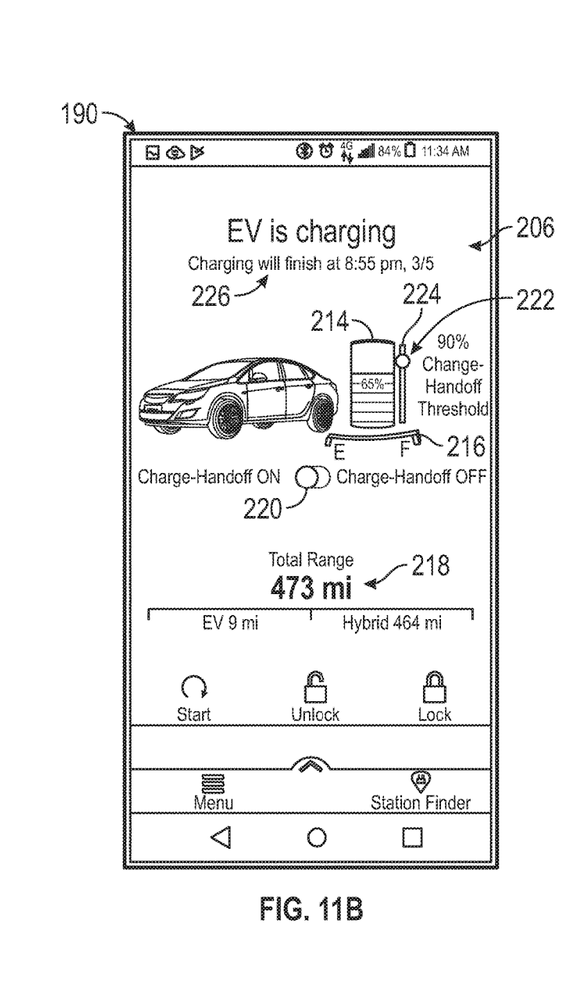

FIGS. 11A and 11B illustrate an exemplary user interface 206 of the application 204 of the mobile device 190. The user interface 206 may include various indicators for displaying charging information concerning the electrified vehicle 12 to the user. For example, the user interface 206 may include a state of charge indicator 214 for graphically illustrating the amount of energy stored in the battery pack 24, a fuel level indicator 216 for indicating engine fuel levels if the electrified vehicle 12 is equipped with an engine, and a total range indicator 218 for indicating the distance the electrified vehicle 12 may travel under the current energy levels.

The user interface 206 may additionally include a toggle 220 for toggling the charge hand-off feature between OFF (FIG. 11A) and ON (FIG. 11B). If the charge hand-off feature has been toggled ON, an additional toggle 222 may appear (see FIG. 11B). The user may adjust the predefined minimum SOC threshold (i.e., the charge hand-off threshold) by dragging the toggle 222 along a scale 224 of the user interface 206. In yet another embodiment, the user interface 206 includes an indicator 226 for estimating the approximate time at which the electrified vehicle 12 will reach the predefined minimum SOC threshold.

Figure 12:
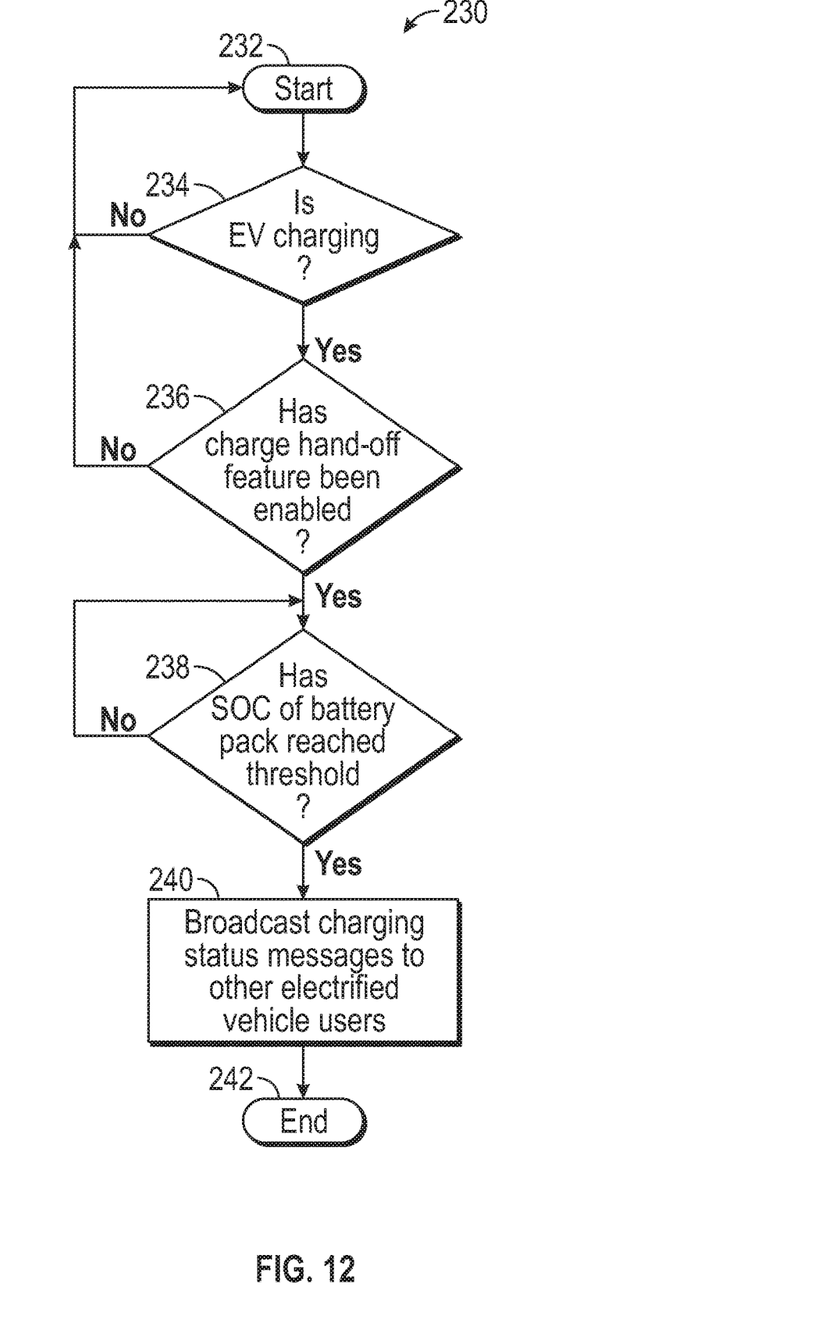
FIG. 12 schematically illustrates a method for facilitating a courtesy hand-off of public charging station equipment from one electrified vehicle user to another using the charging system of FIG. 10.

FIG. 12, with continued reference to FIGS. 10, 11A, and 11B, schematically illustrates a method 230 for facilitating courtesy hand-offs of public charging station equipment between electrified vehicle users. In an embodiment, the control module 174 of the charging system 130 is programmed with one or more algorithms adapted to execute the exemplary method 230.

The exemplary method 230 begins at block 232. At block 234, the control module 174 monitors whether the electrified vehicle 12 is charging. For example, the control module 174 may receive a plug connection signal in response to the user 42 plugging the charge connector 44 into the vehicle inlet assembly 46. If block 234 returns a YES flag, the method 230 proceeds to block 236. Alternatively, if a NO flag is returned, the method 230 returns to block 232.

At block 236, the control module 174 monitors whether the user of the electrified vehicle 12 has enabled the charge hand-off feature and set a predefined minimum SOC threshold for charging the battery pack 24. The charge hand-off feature indicates that the user will allow another user to unplug the charge connector 44 from the vehicle inlet assembly 46. In an embodiment, the charge hand-off feature and the predefined minimum SOC threshold are set by the user using the application 204 of the mobile device 190.

Next, at block 238, the control module 174 monitors whether the current SOC of the battery pack 24 has reached the predefined minimum SOC threshold. If YES, the control module 174 may command the mobile device 190 to broadcast charging status messages at block 240. Once broadcast, the charging status messages indicate to other electrified vehicle users that the user considers charging to be complete and will permit the other users to unplug the electrified vehicle 12 from the charging station 32. In other embodiments, the charging status messages may indicate an amount of time left before the hand-off can commence. The method 230 may end at block 242.

The method 230 of FIG. 12 may be executed by the charging system 130 either in conjunction with or in place of the method 100 of FIG. 8. Accordingly, visual indicators that provide intuitive indications to other vehicle users that the electrified vehicle that is currently on-plug has received a sufficient amount of charge and therefore may be unplugged from a charging station may be displayed both at the electrified vehicle/charging station and remotely from the electrified vehicle/charging station.

The charging systems described above provide significant technical improvements to the overall electrified vehicle charging experience by facilitating courtesy hand-offs to other electrified vehicle users who desire to charge their own vehicles. These hand-offs may be facilitated between electrified vehicle users whether the users are or are not presently located at the public charging station.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
 a battery pack;
 a charging component in charging connection with the battery pack; and
 a control module located on-board the electrified vehicle and being configured to:
  receive an input from a mobile device associated with the electrified vehicle indicating that a charge hand-off feature is enabled; and
  command the mobile device to broadcast a charging status message that facilitates a courtesy hand-off of a charging station component to another electrified vehicle user,
  wherein the charging status message is broadcast from the mobile device to a second, different mobile device.

2. The charging system as recited in claim 1, wherein the charging component is a vehicle inlet assembly.

3. The charging system as recited in claim 1, wherein the mobile device is configured through an application to input a predefined minimum state of charge (SOC) threshold associated with the charge hand-off feature.

4. The charging system as recited in claim 3, wherein the charging status message indicates that the predefined minimum SOC has been reached and thus the courtesy hand-off can occur.

5. The charging system as recited in claim 3, wherein the charging status message indicates an amount of time remaining before reaching the predefined minimum SOC.

6. The charging system as recited in claim 1, comprising a visual indicator on the charging component.

7. The charging system as recited in claim 6, wherein the control module is configured to illuminate the visual indicator in response to reaching a predefined state of charge (SOC) threshold of the battery pack.

8. The charging system as recited in claim 1, comprising a communication system having a first transceiver configured to wirelessly communicate with a second transceiver of the mobile device.

9. The charging system as recited in claim 1, wherein the charging station component is a charge cord of a public charging station.

10. The charging system as recited in claim 1, wherein the mobile device includes an application having a user interface configured to enter the input and to set a predefined minimum SOC threshold that is associated with the charge hand-off feature.

11. The charging system as recited in claim 10, wherein the user interface includes a first toggle for entering the input and a second toggle for setting the predefined minimum SOC threshold.

12. The charging system as recited in claim 1, wherein the charging component is a vehicle inlet assembly equipped with a pictogram, and the control module is configured to illuminate the pictogram in response to reaching a predefined state of charge (SOC) threshold of the battery pack.

13. A charging system for an electrified vehicle, comprising:
 a battery pack;
 a charging component in charging connection with the battery pack; and
 a control module configured to:
  receive an input from a mobile device associated with the electrified vehicle indicating that a charge hand-off feature is enabled; and
  command the mobile device to broadcast a charging status message that facilitates a courtesy hand-off of a charging station component to another electrified vehicle user,
 wherein the charging status message is broadcast from the mobile device to at least one other mobile device associated with the another electrified vehicle user.

14. A method, comprising:
 receiving, at an on-board control module of an electrified vehicle, an input from a mobile device associated with the electrified vehicle indicating that a charge hand-off feature is enabled; and
 commanding, via the control module, the mobile device to broadcast a charging status message that facilitates a courtesy hand-off of a charging station component to another electrified vehicle user,
 wherein the charging status message is broadcast from the mobile device to at least one other mobile device associated with the another electrified vehicle user.

15. The method as recited in claim 14, comprising illuminating a visual indicator of a charging component located on-board the electrified vehicle in response to reaching a predefined minimum state of charge (SOC) threshold when charging a battery pack of the electrified vehicle.

16. The method as recited in claim 14, wherein the mobile device is configured through an application to input a predefined minimum state of charge (SOC) threshold associated with the charge hand-off feature.

17. The method as recited in claim 16, wherein the charging status message indicates that the predefined minimum SOC has been reached and thus the courtesy hand-off can occur.

18. The method as recited in claim 16, wherein the charging status message indicates an amount of time remaining before reaching the predefined minimum SOC.

* * * * *